(12) United States Patent
Kwak et al.

(10) Patent No.: US 7,668,978 B1
(45) Date of Patent: Feb. 23, 2010

(54) METHOD AND SYSTEM FOR STORING FRAMES IN NETWORKS

(75) Inventors: David T Kwak, Newport Coast, CA (US); Ali A. Khwaja, Irvine, CA (US); Jerald K. Alston, Coto de Caza, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 214 days.

(21) Appl. No.: 11/357,515

(22) Filed: Feb. 17, 2006

(51) Int. Cl.
*G06F 3/00* (2006.01)
*G06F 15/167* (2006.01)
*G06F 13/00* (2006.01)

(52) U.S. Cl. .............................. 710/14; 710/8; 709/215; 711/147

(58) Field of Classification Search ..................... 710/14
See application file for complete search history.

(56) References Cited

U.S. PATENT DOCUMENTS

| | | | | |
|---|---|---|---|---|
| 5,410,669 A | * | 4/1995 | Biggs et al. ................. | 711/118 |
| 5,734,328 A | * | 3/1998 | Shinbori ..................... | 340/2.7 |
| 5,737,525 A | * | 4/1998 | Picazo et al. ................ | 709/249 |
| 6,807,581 B1 | * | 10/2004 | Starr et al. .................. | 709/250 |
| 2005/0064866 A1 | * | 3/2005 | Sun et al. ................. | 455/426.1 |

* cited by examiner

*Primary Examiner*—Henry W. H. Tsai
*Assistant Examiner*—Michael Sun
(74) *Attorney, Agent, or Firm*—Klein, O'Neill & Singh, LLP (57) ABSTRACT

Method and system for an adapter operationally coupled to a host system and a network is provided. The adapter includes an internal memory that can be configured in a first mode to operate as a dedicated random access memory used by a main processor of the adapter; or configured in a second mode to operate both as a random access memory used by the main processor and also used for storing information received from the network. The method includes enabling the second mode of the internal memory so that the internal memory is configured to operate both as random access memory for the main processor and for storing information received from the network.

18 Claims, 6 Drawing Sheets

METHOD AND SYSTEM FOR STORING FRAMES IN NETWORKS

BACKGROUND

1. Field of the Invention

The present invention relates to networks, and more particularly to staging frames in long distance links.

2. Background of the Invention

Storage area networks ("SANs") are commonly used where plural memory storage devices are made available to various host computing systems. Data in a SAN is typically moved between plural host systems (that include computer systems, servers and others) and storage systems (or storage devices, used interchangeably throughout this specification) through various controllers/adapters.

Host systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety. PCI-Express is another Input/Output ("I/O") bus standard (incorporated herein by reference in its entirety) that is compatible with existing PCI cards using the PCI bus.

Various other standard interfaces are also used to move data between host systems and storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others.

Networks in general and SANs in particular are now expected to operate at high speeds, sometimes at a rate greater than 4 Gigabits per second ("GB") (for example, 10 GB). Often these systems operate using long links to communicate with each other. The term link as used herein throughout this specification is the actual physical link that connects one device to another. In some instances these links can be 10 kilometer long. The term long link as used herein is not based on any particular length. A long link is a link due to which frames (or data packets) need to be staged before they can be processed by an adapter/controller.

HBAs facilitating data transfer in such high speed environment with long links (for example, 10 Km long) typically use external non-volatile memory devices (for example, random access memory devices) to store frames that are received from the network. The use of external memory devices is expensive and also delays frame processing. This is undesirable in high bandwidth/long link environment.

Although the foregoing problem has been highlighted with respect to SANs, the same problem exists with other types of network that use high bandwidth and long links. For example, an Ethernet network operating over long links can have the same problems where a network adapter has to use external memory (for example, random access memory ("RAM")) for staging frames.

Based on the foregoing, there is a need for a method and system for efficiently processing frames.

SUMMARY OF THE INVENTION

In one aspect of the present invention, an adapter operationally coupled to a host system and a network is provided. The adapter includes an internal memory that can be configured in a first mode to operate as a dedicated random access memory used by a main processor of the adapter; or configured in a second mode to operate both as a random access memory used by the main processor and also used for storing information received from the network.

In another aspect of the present invention, a network system is provided. The network system includes a host computing system operationally coupled to an adapter, wherein the adapter includes an internal memory that can be configured in a first mode to operate as a dedicated random access memory used by a main processor of the adapter; or configured in a second mode to operate both as a random access memory for the main processor and for storing information received from the network.

In yet another aspect of the present invention, a method for storing information received from a network is provided. The method includes determining if internal memory used by an adapter operationally coupled to a host system and the network should be configured in a first mode or a second mode and if the internal memory is configured in a first mode then it operates as a random access memory for a main processor of the adapter; and enabling the second mode of the internal memory so that the internal memory is configured to operate both as random access memory for the main processor and for storing information received from the network.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

In one aspect of the present invention, a host bus adapter with a main processor is provided. The main processor uses an internal memory to store executable code. The internal memory can operate in different modes. In a first mode, the internal memory operates strictly as non-volatile memory for storing executable code. In a second mode (may also be referred to as a Buffer Plus Mode), which is set by the main processor, the internal memory is configured so that the main processor can store executable code in a first portion of the internal memory, while a second portion of the internal memory is used to store frames that are received from the network.

To facilitate an understanding of the preferred embodiment, the general architecture and operation of a SAN, and a HBA will be described. The specific architecture and operation of the preferred embodiment will then be described with reference to the general architecture of the SAN and HBA.

Figure 1A:
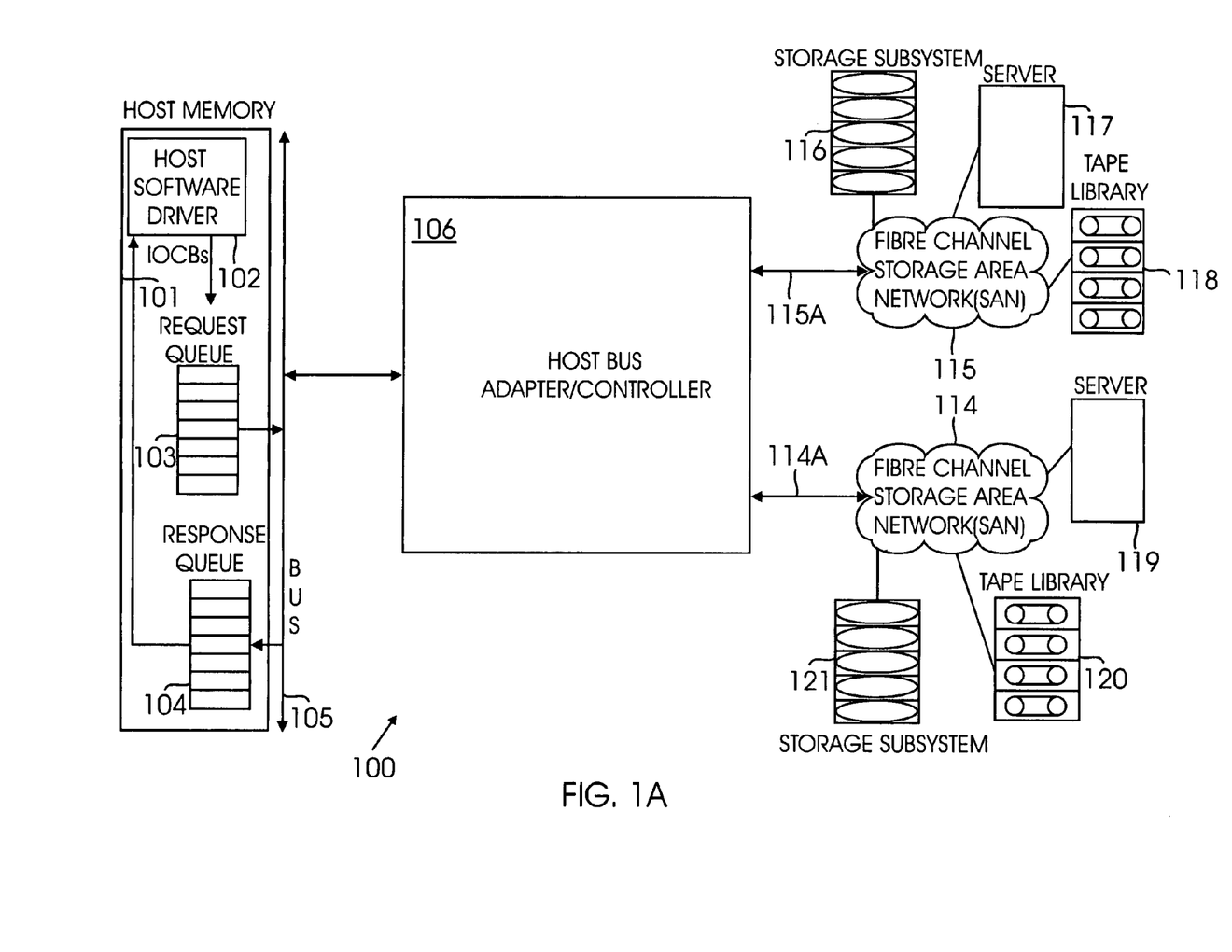
FIG. 1A is a block diagram showing various components of a SAN.

SAN Overview:

FIG. 1A shows a SAN system 100 that uses a HBA 106 (referred to as "adapter 106") for communication between a host system with host memory 101 to various storage systems (for example, storage subsystem 116 and 121, tape library 118 and 120) using Fibre Channel storage area networks 114 and 115. Servers 117 and 119 can also access the storage sub-systems (for example, 116 and 121) using SAN 115 and 114, respectively.

Links 115A and 114A are long links that are used to transfer data to/from the network.

Host memory 101 includes a driver 102 that co-ordinates all data transfer via adapter 106 using input/output control blocks ("IOCBs").

A request queue 103 and response queue 104 is maintained in host memory 101 for transferring information using adapter 106. Host system communicates with adapter 106 via bus 105 (PCI or PCI-Express).

Figure 1B:
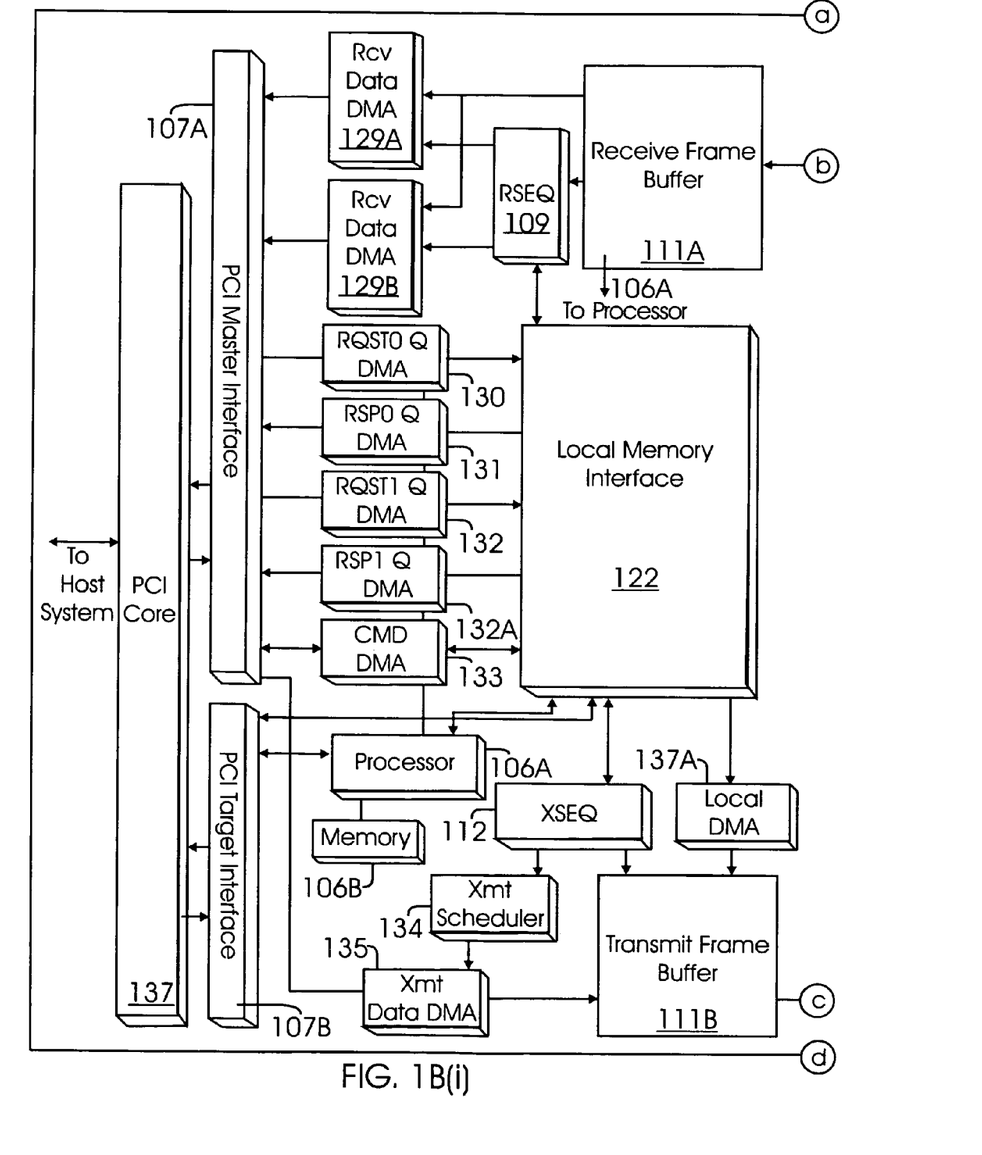
FIG. 1B is a block diagram of a host bus adapter used according to one aspect of the present invention.

HBA 106:

FIG. 1B shows a block diagram of adapter 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor may be used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes a main processor 106A, which may be a reduced instruction set computer (referred to herein as "RISC") for performing various functions in adapter 106. It is noteworthy that the adaptive aspects of the present invention are not limited to any particular type of processor. RISC 106A has access to internal volatile memory (for example, RAM) 106B that is used either exclusively as a RAM for RISC 106A; or in the Buffer Plus Mode, as RAM and also for storing frames/data packets that are received via links 115A/114A.

Adapter 106 also includes Fibre Channel interface (also referred to as Fibre Channel protocol manager "FPM") module 113 that includes modules 113A and 113B in receive and transmit paths, respectively (shown as "FC RCV" and "FC XMT"). Modules 113A and 113B allow data to move to/from storage systems and are described below in detail. Frames 146A are received from a Fibre Channel network, while frames 146B are transmitted to the Fibre Channel network. Frames 146A can be stored in memory 106B, when memory 106B is used in the Buffer Plus Mode.

Adapter 106 includes local memory interface 122 for managing external local memory (not shown) when used by RISC 106A. Local DMA module 137A is used for gaining access to a channel to move data from local memory. Adapter 106 also includes a serial/de-serializer (shown as "XGXS/SERDES") 136 for converting data from 10-bit to 8-bit format and vice-versa, and is described below in detail.

Adapter 106 also includes request queue DMA channel (0) 130, response queue (0) DMA channel 131, response queue (1) 132A, and request queue (1) DMA channel 132 that interface with request queue 103 and response queue 104; and a command DMA channel 133 for managing command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

PCI master interface 107A and PCI target interface 107B are both coupled to a PCI Core logic 137 (may also be referred to as "logic 137"). Logic 137 is coupled to a host system.

Figure 2A:
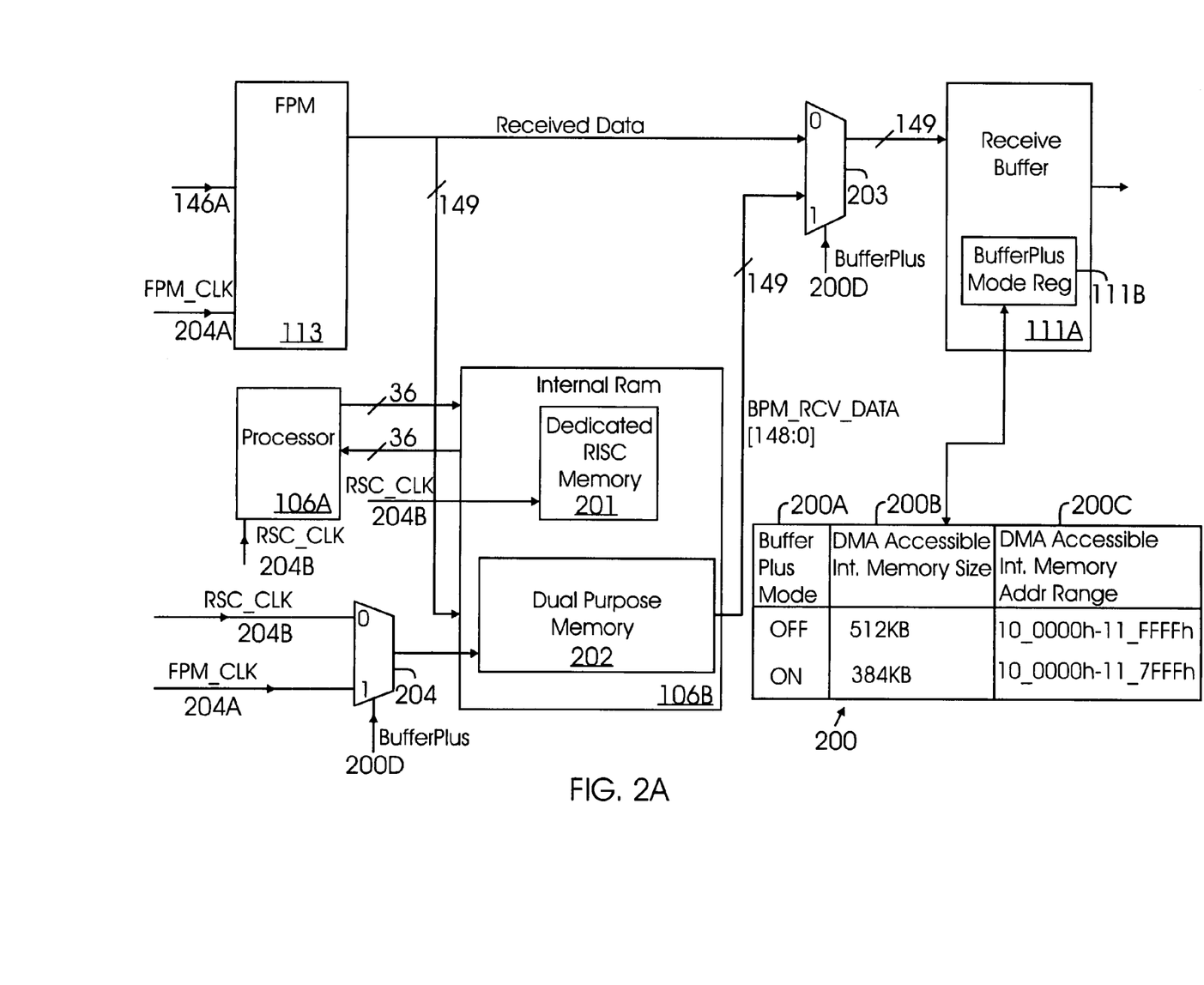
FIG. 2A shows a block diagram of a system using an internal memory in a Buffer Plus Mode, according to one aspect of the present invention.

Buffer Plus Mode:

In one aspect of the present invention, memory 106B is configured by RISC 106A to operate as a RAM and also used to store incoming frames 146A from the network (i.e. in the Buffer Plus Mode). RISC 106A sets a bit in register 111B that enables the Buffer Plus Mode. FIG. 2A shows an example of a system for using memory 106B in the Buffer Plus Mode.

The Buffer Plus Mode is set by using Table 200 that is stored in receive buffer 111A. Table 200 has column 200A that shows when the Buffer Plus Mode is "On" or "Off". RISC 106A sets a bit to enable or disable the Buffer Plus Mode. Column 200B shows an example of memory size that is available to RISC 106A. The memory size is lower when the Buffer Plus Mode is on (shown as 384 KB) and higher when off (shown as 512 KB). Column 200C provides the internal memory address that is accessible for DMA access based on when the Buffer Plus Mode is on or off.

Frames 146A are received from the network by FPM 113 that operates in FPM_CLK 204A. The received data can be stored in dual-purpose memory 202 when memory 106B is operating in the Buffer Plus Mode. Data from memory 202 is sent to receive buffer 111A via multiplexer ("Mux") 203. Signal 200D enables/disables the Buffer Plus Mode for dual-purpose memory 202.

It is noteworthy that memory blocks 201 and 202 in memory 106B are shown as separate blocks to illustrate the Buffer Plus Mode. However, blocks 201 and 202 can be a part of a single block of memory or two separate blocks of memory.

RISC 106A operating in the RSC_CLK 204B uses memory 201 exclusively as a RAM when the Buffer Plus Mode is off. Dual-purpose memory 202 operates in either RSC_CLK 204B or FPM_CLK 204A depending on signal 200D (i.e. whether the Buffer Plus Mode is on or off). Mux 204 selects the proper clock.

Figure 2B:
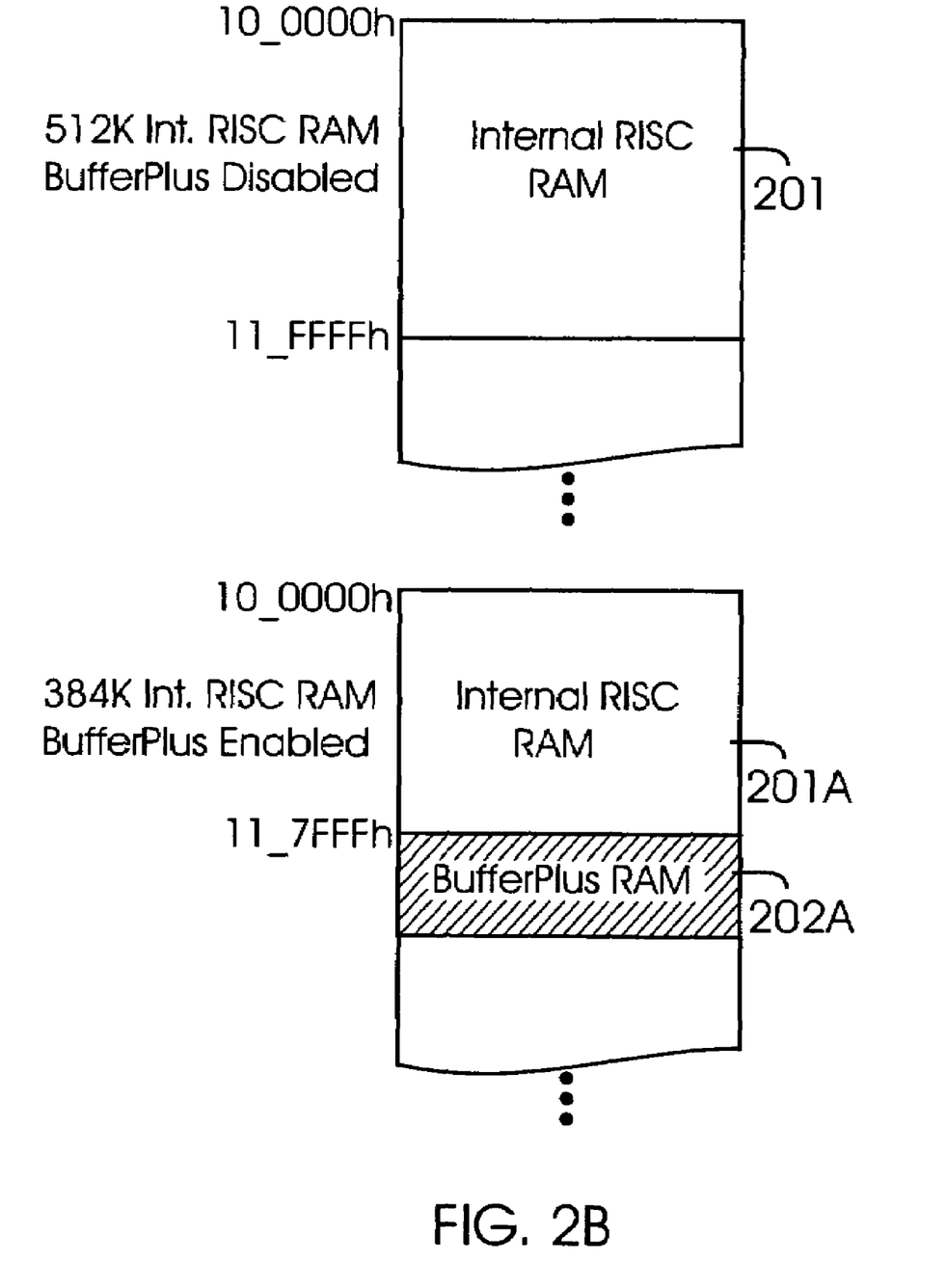
FIG. 2B shows an example of a memory layout, according to one aspect of the present invention.

FIG. 2B shows an example of using memory 106B when the Buffer Plus Mode is enabled or disabled. When Buffer Plus Mode is disabled, the entire memory (shown as 201, 512 KB) is available as internal RAM. When Buffer Plus Mode is set, then the internal RAM 201A is 384K and the Buffer Plus RAM 202A is used to store frames 146A. It is noteworthy that the present invention is not limited to any particular memory type or memory size.

Figure 3:
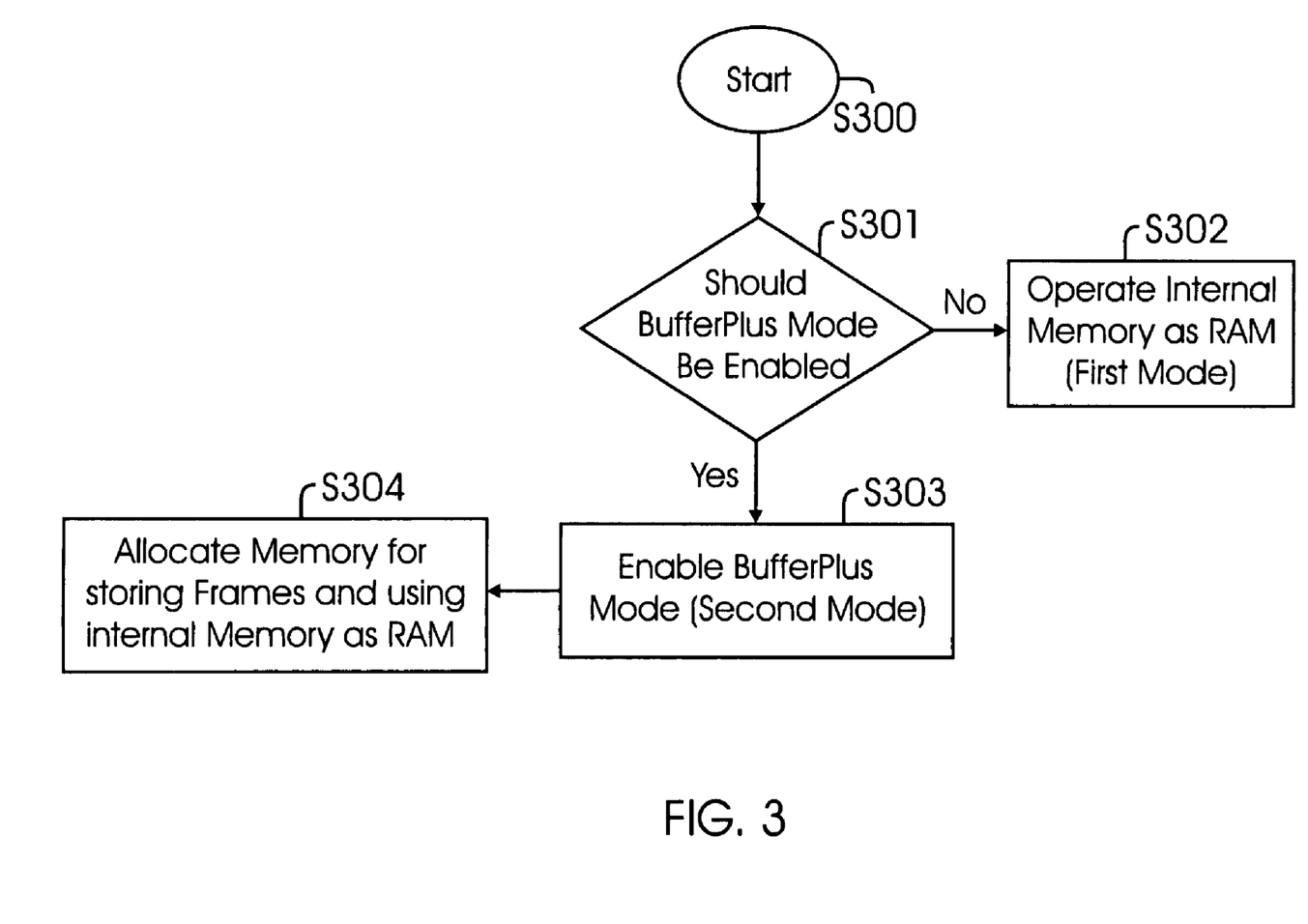
FIG. 3 shows a process flow diagram for using the Buffer Plus Mode, according to one aspect of the present invention.

FIG. 3 shows a top-level process flow diagram for setting the Buffer Plus Mode, according to one aspect of the present invention. The process starts in step S300. In step S301, Processor 106A determines if the Buffer Plus Mode should be enabled. Plural conditions can be used to enable this feature. For example, if the link used by HBA 106 is of a particular length, then the Buffer Plus Mode can be enabled.

If the Buffer Plus Mode is not to be enabled, then in step S302, memory 106B operates as a dedicated RAM for processor 106A (shown as 201 in FIG. 2A and also in FIG. 2B).

If the Buffer. Plus Mode is to be enabled in step S301, then Processor 106A enables the mode in step S303. In one aspect, a bit is set to enable the Buffer Plus Mode, as shown in FIG. 2A. In step S304, processor 106A allocates a certain portion or memory 106B to operate as a RAM and another portion to receive frames. Memory 106B operates as a dual-purpose memory, i.e. as a RAM for processor 106A and to store frames that are received from the network (shown as 202 in FIG. 2A and also in FIG. 2B).

It is noteworthy that although the foregoing example has been shown with respect to a HBA, the Buffer Plus Mode could be used for other network adapters.

In one aspect of the present invention, internal memory can be used efficiently as RAM and to store frames. Because the memory is internal, frames can be moved with less latency. Furthermore, additional external memory is not needed, which saves cost.

Although the present invention has been described with reference to specific embodiments, these embodiments are illustrative only and not limiting. Many other applications and embodiments of the present invention will be apparent in light of this disclosure and the following claims.

The invention claimed is:

1. An adapter operationally coupled to a host computing system and a network, the adapter comprising:
   a main processor having access to an internal memory, wherein the internal memory is selectably configurable to operate in a first mode and a second mode, the mode of operation being determined by the main processor depending on a length of a link used by the adapter for network communication,
   wherein in the first mode, using a first clock, the internal memory operates exclusively as a dedicated random access memory for the main processor, and in the second mode, using a second clock, a first portion of the internal memory operates as a random access memory used by the main processor and a second portion of the internal memory operates as a memory buffer for storing information received from the network; and
   wherein the information received from the network is stored in the second portion of the internal memory, if the second mode is enabled.

2. The adapter of claim 1, wherein the second mode is a Buffer Plus Mode that is set by the main processor by setting a register bit in a register.

3. The adapter of claim 2, wherein the register is a part of a receive frame buffer that is used to process information received from the network.

4. The adapter of claim 1, wherein the random access memory available to the main processor in the first mode is greater than the random access memory available to the main processor in the second mode.

5. The adapter of claim 1 being a host bus adapter operating in a storage area network.

6. The adapter of claim 5, wherein a Fibre Channel protocol manager receives incoming frames and operates at a clock different from a main processor clock.

7. A network system, comprising:
   a host computing system;
   an adapter operationally coupled to the host computing system, wherein the adapter includes a main processor having access to an internal memory, wherein the internal memory is selectably configurable to operate in a first mode and a second mode, the mode of operation being determined by the main processor depending on a length of a link used by the adapter for network communication,
   wherein in the first mode, using a first clock, the internal memory operates exclusively as a dedicated random access memory for the main processor, and in the second mode, using a second clock, a first portion of the internal memory operates as a random access memory used by the main processor and a second portion of the internal memory operates as a memory buffer for storing information received from the network; and
   wherein the information received from the network is stored in the second portion of the internal memory, if the second mode is enabled.

8. The system of claim 7 wherein the second mode is a Buffer Plus Mode that is set by the main processor by setting a register bit in a register.

9. The system of claim 8, wherein the register is a part of a receive frame buffer that is used to process information received from the network.

10. The system of claim 7, wherein the random access memory available to the main processor in the first mode is greater than the random access memory available to the main processor in the second mode.

11. The system of claim 7 being a host bus adapter operating in a storage area network.

12. The system of claim 11, wherein a Fibre Channel protocol manager receives incoming frames and operates at a clock different from a main processor clock.

13. A method for storing information received from a network, comprising:
   configuring an internal memory of an adapter operationally coupled to a host system and the network, to operate in a first mode or a second mode, where in the first mode, using a first clock, the internal memory operates exclusively as a random access memory for a main processor of the adapter; and where in the second mode, using a second clock, a first portion of the internal memory operates as a random access memory for the main processor and a second portion of the internal memory operates as a buffer for storing information received from the network; wherein the first mode and the second mode of operation is set by the main processor of the adapter based on a length of a link used by the adapter for network communication;
   receiving information from the network; and
   storing the information in the second portion of the internal memory, if the second mode is enabled.

14. The method of claim 13, wherein the second mode is a Buffer Plus Mode that is set by the main processor by setting a register bit in a register.

15. The method of claim 14, wherein the register is a part of a receive frame buffer that is used to process information received from the network.

16. The method of claim 13, wherein the random access memory available to the main processor in the first mode is greater than the random access memory available to the main processor in the second mode.

17. The method of claim 13, wherein the adapter is a host bus adapter operating in a storage area network.

18. The method of claim 17, wherein a Fibre Channel protocol manager receives incoming frames and operates at a clock different from a main processor clock.

* * * * *

UNITED STATES PATENT AND TRADEMARK OFFICE
CERTIFICATE OF CORRECTION

PATENT NO. : 7,668,978 B1  Page 1 of 1
APPLICATION NO. : 11/357515
DATED : February 23, 2010
INVENTOR(S) : David T Kwak et al.

It is certified that error appears in the above-identified patent and that said Letters Patent is hereby corrected as shown below:

In column 5, line 63, in claim 7, delete "haying" and insert -- having --, therefor.

In column 6, line 15, in claim 8, delete "7" and insert -- 7, --, therefor.

Signed and Sealed this

Twenty-sixth Day of October, 2010

David J. Kappos
*Director of the United States Patent and Trademark Office*